(12) United States Patent
Toy

(10) Patent No.: US 6,776,422 B1
(45) Date of Patent: Aug. 17, 2004

(54) SLOTTED ELASTOMERIC O-RINGS

(76) Inventor: William W. Toy, 511 Andros La., Indian Harbour Beach, FL (US) 33937

( * ) Notice: Subject to any disclaimer, the term of this patent is extended or adjusted under 35 U.S.C. 154(b) by 341 days.

(21) Appl. No.: 10/180,355

(22) Filed: Jun. 26, 2002

(51) Int. Cl.$^7$ ................................. F16J 15/02
(52) U.S. Cl. .................. 277/628; 277/641; 277/910
(58) Field of Search ............... 277/602, 605, 277/626, 628, 641, 645, 647, 910

(56) References Cited

U.S. PATENT DOCUMENTS

| | | | |
|---|---|---|---|
| 2,521,248 A | | 9/1950 | Parker |
| 2,590,759 A | | 3/1952 | Dale |
| 2,729,478 A | * | 1/1956 | Chambers ............ 277/390 |
| 3,921,991 A | * | 11/1975 | Beck ............ 251/214 |
| 4,618,154 A | * | 10/1986 | Freudenthal ........ 277/530 |
| 5,312,116 A | | 5/1994 | Quaglia |
| 5,865,971 A | * | 2/1999 | Sunkara ............ 204/280 |
| 6,161,841 A | | 12/2000 | Shaw |
| 6,283,156 B1 | | 9/2001 | Motley |

OTHER PUBLICATIONS

Problem Solving Products Inc, Petroleum, oils resistance elastomer at Problem Solving Products, Copyright 1997–2002.*

* cited by examiner

Primary Examiner—Alison Pickard
Assistant Examiner—E. Peavey
(74) Attorney, Agent, or Firm—Alvin S. Blum

(57) ABSTRACT

An O-ring is made of elastomeric material. It lies in a plane. The O-ring has a circular radial axial section. The O-ring is provided with a concentric slot that extends perpendicular to the plane from a surface of the ring to a point past the center of the circular axial section. The O-ring conforms to confined spaces by bending and closing the slot.

3 Claims, 2 Drawing Sheets

PRIOR ART

SLOTTED ELASTOMERIC O-RINGS

This invention relates to O-ring seals, and more specifically to O-rings of elastomeric material that are provided with a particular slot construction.

BACKGROUND OF THE INVENTION

Seals in the form of O-rings made of rubber or rubber-like materials such as elastomers are well known. They are circular in cross section. They generally fit into rectangular cross section cavities of slightly smaller dimensions. This causes deformation of the ring by forces exerted at the tangential contacts of the ring with the flat walls of the cavity. The deformation provides wide contacts for enhanced sealing. As the ring deforms, material is forced from the circular section. The forces involved increase exponentially with the degree of deformation. Consequently, the dimensions of the cavity must be carefully controlled. For this reason, the sealing cavities generally must be precision machined, rather than economically cast or molded. In dynamic sealing situations, there is a tendency for the ring to roll. Another problem is the tendency for the ring to absorb fluids, such as lubricants. As the ring absorbs fluid, it will swell. This may create excessive friction, heating the ring and even freezing operation.

U.S. Pat. No. 2,521,248 to Parker discloses O-rings with V shaped slots that do not extend beyond the center of the cross section to accommodate swelling and prevent rolling in dynamic sealing situations.

U.S. Pat. No. 2,729,478 to Chambers discloses an O-ring made of tough, substantially nondeformable material such as "Teflon" that is lubricious and resistant to lubricant absorption.

SUMMARY OF THE INVENTION

It is accordingly an object of the invention to provide an O-ring that will be resistant to rolling. It is another object to provide an O-ring that will better tolerate the swelling from absorption of lubricant. It is yet another object to provide an O-ring that will be able to accommodate to cavities of wider tolerance. It is yet another object to provide an O-ring that seals effectively with reduced friction, and for low pressure dynamic applications. The O-ring of the invention comprises an elastomeric composition having a radial axial cross section that is substantially the shape of a circle. A concentric slot extends at right angles to the plane of the ring from the surface of the ring to a point past the center of the circle. This structure enables the ring to conform to a confined space by bending and closing the slot.

These and other objects, features, and advantages of the invention will become more apparent when the detailed description is studied in conjunction with the drawings in which like elements are designated by like reference characters in the various drawing figures.

DETAILED DESCRIPTION OF PREFERRED EMBODIMENTS

Figure 1:
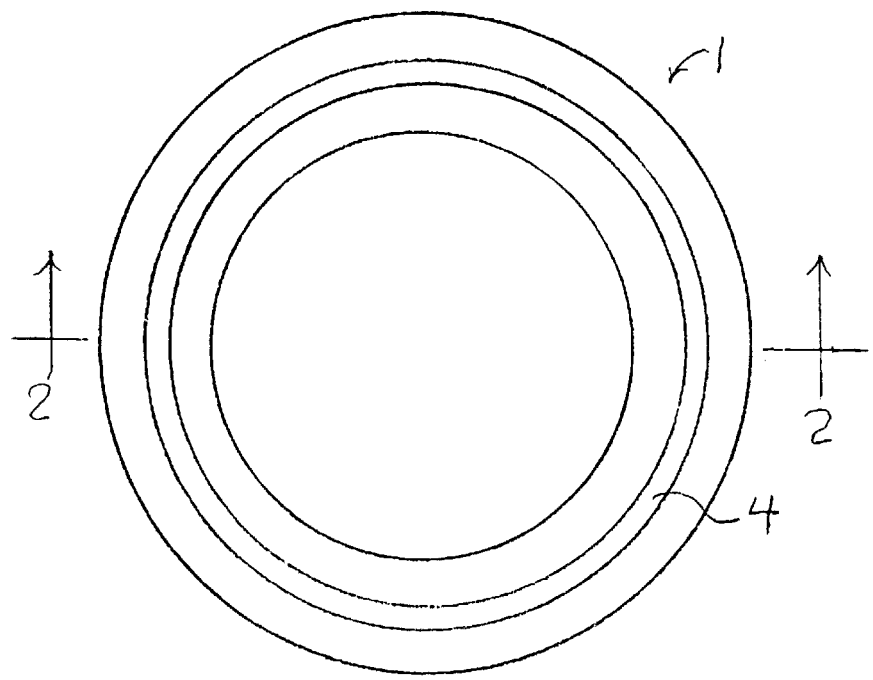
FIG. 1 is a plan view of an O-ring of the invention.
Figure 2:
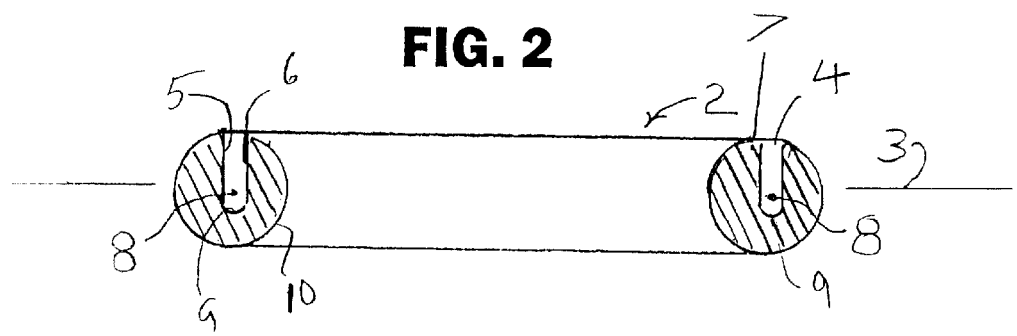
FIG. 2 is a section view taken through line 2—2 of FIG. 1.

Referring now to the drawing FIGS. 1 and 2, a sealing ring, or O-ring 1 of the invention is formed of an elastomeric material. The material has sufficient inherent resilience to deform in a cavity when the tangential surface of the ring is forced against the walls of a cavity while elastically exerting a sealing force against the walls. The ring forms an annulus 2 lying in a plane 3. The ring has a radial axial sectional shape of a circle 10 with a center 8. A single continuous, concentric slot 4 has sides 5 and 6 extending from the surface 7 of the ring in a direction orthogonal to the plane 3 to a point 9 beyond the center 8 of the circle.

Figure 3:
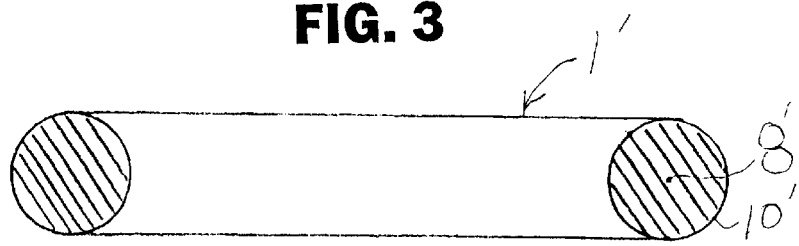
FIG. 3 is a section view as in FIG. 2 of a solid O-ring of the prior art.
Figure 6:
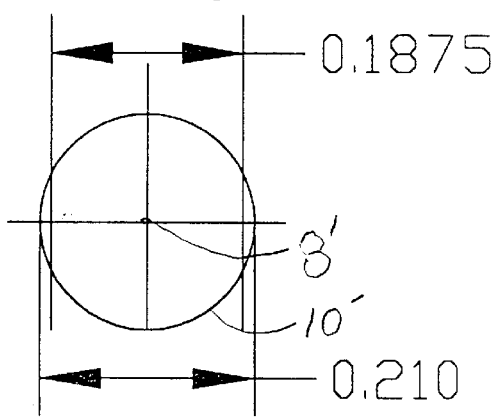
FIG. 6 is a radial section of a conventional solid O-ring of the prior art with dimensions for insertion into a cavity.
Figure 7:
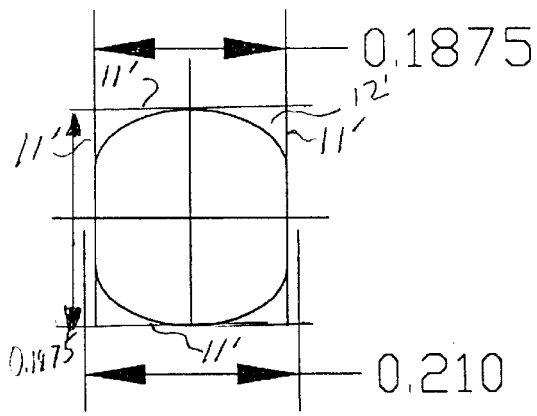
FIG. 7 is the radial section of FIG. 6 showing the deformation when the O-ring is within the cavity.

Referring now to FIGS. 3, 6, and 7, a conventional O-ring 1' of the prior art has a radial axial sectional shape of a solid circle 10' with a center 8'. As seen in FIG. 7, the ring is confined within a cavity 12' with cavity walls 11' to perform its sealing function. The dimensions of the ring must be carefully controlled relative to the cavity dimensions, as shown, to enable effective deformation of the ring by flattening the circle 10' at its tangential contacts with the walls 11'. The elastomeric material of the ring is substantially incompressible. In order to assume the shape shown in FIG. 7, material must be displaced from the areas of contact with the walls 11'. The forces required for this displacement vary non-linearly with the amount of displacement required. If much displacement is required, the forces become so great that they are incompatible with the operation. If there is a moving contact, the friction involved may restrict motion. If there is any absorption of lubricant, the forces against the walls may cause the machinery to freeze up. This is a common cause of failure.

Figure 4:
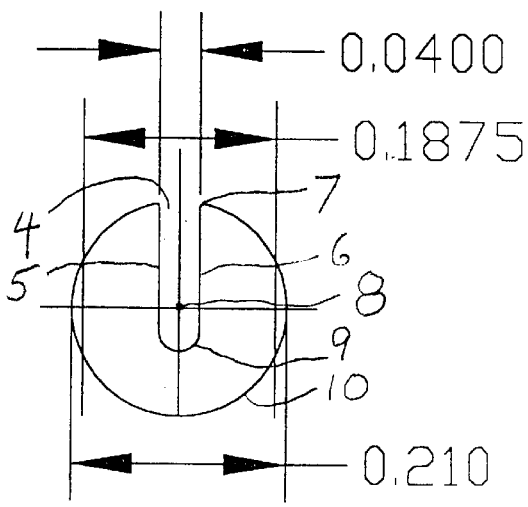
FIG. 4 is a radial section of an O-ring of the invention with dimensions for insertion into a cavity.
Figure 5:
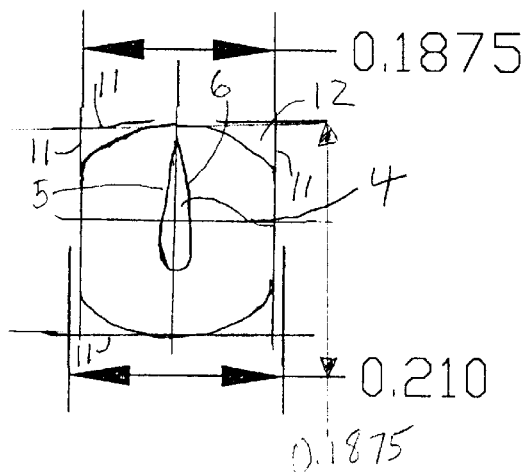
FIG. 5 is the radial section of FIG. 4 showing the deformation when the O-ring is within the cavity.

By making the slot perpendicular to the plane of the ring, the molding of the ring is more easily and economically performed. The ring is easily released from the mold without special apparatus. Referring now to FIGS. 4 and 5, an O-ring 1 of the instant invention has a radial axial sectional shape of a circle 10 with a center 8 and a slot 4 with sides 5 and 6 extending from the surface 7 to a point 9 beyond the center 8. As seen in FIG. 5, the ring is confined within a cavity 12 with cavity walls 11 to perform its sealing function. The dimensions of the ring need not be as carefully controlled relative to the cavity dimensions, as shown, to enable effective deformation of the ring by flattening the circle 10 at its tangential contacts with the walls 11, because the sides 5 and 6 simply bend toward one another, collapsing the slot. Bending the elastomeric material of the ring requires much less force in order to assume the shape shown in FIG. 5, than the displacement required for a solid ring or a ring with a slot that does not go beyond the center of the circle. The forces required for this displacement are more linear with the amount of displacement required. Consequently, the elastic restoring forces on the walls 11 are not as great. If there is a moving contact, the friction involved is much less. If there is any absorption of lubricant, the forces against the walls will not increase so greatly, because the slot will just collapse more. There will be less cause for the machinery to freeze up. Because the dimensions of ring and cavity need not be so carefully controlled as in the prior art, less precise tolerances are required. This enables the use of more economical production methods. As the slot closes, the shape of the ring is less round, and thus more resistant to rolling in a dynamic sealing application.

While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A sealing ring comprising:
   a) an annulus of elastic deformable material disposed in a plane, the annulus having the shape of a circle in radial axial section, the circle having a center; and
   b) a single continuous, concentric slot, the slot extending at right angles to the plane from a surface of the annulus, through said center, and to a point beyond said center.

2. A sealing ring comprising: an annulus of elastic deformable material disposed in a plane, the annulus having the shape of a circle in radial axial section, the circle having a center; the annulus having a single continuous, concentric slot, the slot extending orthogonal to said plane from a surface of the ring through said center to a point beyond the center of the circle.

3. A sealing ring comprising: an O-ring formed of elastic deformable material in the shape of an annulus lying in a plane and having a radial axial section in the shape of a circle having a center; a concentric slot in the ring extending from a surface of the ring through said center to a point past said center; the slot having sides that are substantially perpendicular to said plane.

* * * * *